UNITED STATES PATENT OFFICE 2,088,085

PRODUCTION OF STABLE AND EFFICIENT FOAM

Eberhard Gross, Wuppertal-Elberfeld, Hanns Wappes, Ludwigshafen-on-the-Rhine, Bruno Hilgenfeldt, Wuppertal-Vohwinkel, and Albert Petz, Mannheim, Germany, assignors to I. G. Farbenindustrie Aktiengesellschaft, Frankfort-on-the-Main, Germany No Drawing. Application October 3, 1934, Serial No. 746,700. In Germany October 6, 1933

6 Claims. (Cl. 252—6)

The present invention relates to a process of producing stable and efficient foams.

For the production of foam, especially for fire-extinguishing purposes, it has already been proposed to prepare aqueous saponine solutions with or without an addition of molasses or sugar while employing air or other gases in suitable apparatus.

We have now found that especially stable and very efficient foam can be produced by adding to solutions, preferably aqueous solutions, of wetting agents, solvents corresponding to the general formula

$$R_1-(O-CH_2-CH_2)_n-O-R_2$$

(in which $R_1$ is a hydrogen atom or an alkyl radicle, $R_2$ is a hydrogen atom, or an alkyl, aralkyl or aryl radicle, $n$ is a whole number and in which the total number of carbon atoms is at least 3) and introducing a gas, usually air, in a state of fine division into the resulting mixture.

The solution of the wetting agent is preferably prepared from products having not only a high wetting power but also a considerable foaming power; suitable materials are for example highly sulphonated vegetable or animal oils, as for example highly sulphonated castor oil, alkali metal salts of alkylated aromatic sulphonic acids, such as the sodium salt of propylated or butylated naphthalene sulphonic acids, or sulphuric esters of saturated or unsaturated aliphatic alcohols of high molecular weight. Condensation products derived from fatty acids of high molecular weight or their derivatives and hydroxy- or amino-alkyl sulphonic acids, reaction products of ethylene oxide on organic compounds containing one or more hydroxyl, carboxylic or amino groups in the molecule and the like are also suitable.

As solvents may be mentioned for example diethylene glycol monomethyl or monoethyl ether, triethylene glycol monomethyl or monoethyl ether and tetraethylene glycol monobutyl ether. The corresponding dialkyl ethers, as for example diethylene glycol diethyl ether (obtainable from diethylene glycol monoethyl ether by alkylation, for example with diethyl sulphate, or by adding on acetylene to form diethylene glycol vinyl ethyl ether and hydrogenation with the formation of diethylene glycol diethyl ether) are also suitable. Monocresyl or monoxylenyl ethers of mono-, di-, tri- or tetra-ethylene glycol may also be employed. When employing such solvents, an addition of protective colloids, molasses or sugar may be dispensed with without injuriously affecting the foam formation or stability of the resulting foam; in this way the undesirable introduction of micro-organisms into the preparations serving for the preparation of foam is avoided at the same time.

According to this invention it is even possible to prepare highly concentrated solutions which are mobile (capable of being poured) at low temperatures; this is very advantageous for the production of foam because it is no longer necessary to carry large amounts of liquid, as for example on fire-extinguishing apparatus. It is frequently advantageous for the purpose of further stabilizing the resulting mixtures (i. e. preventing dehomogenization) to add other substances, as for example urea, thiourea, alkylated cellulose, salts of polymerized acrylic acids or degraded albuminous substances, to the mixtures. The optimum foam-forming power of the different mixtures is frequently dependent on the salt content and on the hydrogen ion concentration. The most preferable conditions depend on the initial materials and may be readily ascertained by a simple experiment.

The mixtures to be employed according to the present invention for the production of foam can be prepared in very high concentrations.

The foam obtainable according to this invention is very stable and usually very dense and composed of small bubbles; it may be passed through relatively long conduits without being dehomogenized. In view of its advantageous properties it is eminently suitable for combating fires and for the precipitation of finely distributed dust, especially the rock dust in mines. In the latter case it is preferable to introduce the foam directly into the boring holes, as for example according to the Patent No. 1,850,143 the dust thus being rendered innocuous directly after its formation.

The following examples will further illustrate the nature of this invention but the invention is not restricted to these examples. The parts are by weight.

Example 1

80 parts of oleic acid-N-methyltaurine having a content of about 30 per cent of inorganic salts are dissolved in 150 parts of warm water and 50 parts of crude diethylene glycol monoethyl ether and 20 parts of urea or thiourea are added to the solution. The hydrogen ion concentration of the solution is adjusted to pH=3 by means of hydrochloric acid.

300 grams of this mixture are introduced into 200 liters of water and finely divided air is blown into the solution through a nozzle or a sieve plate in a closed vessel having a foam outlet pipe. An extremely dense, fine-bubbled and stable foam is formed which may be led for great distances through pipes without its stability being injuriously affected.

The oleic acid-N-methyltaurine employed in the above case can be replaced wholly or partly by other substances having wetting, dispersing and foaming power. Instead of diethylene glycol monoethyl ether, other solvents of the kind defined above may be employed with the same result, the combinations having the best effect being readily ascertained by experiment.

Example 2

A solution of 60 parts of the water-soluble product obtainable by reacting 25 molecular proportions of ethylene oxide with 1 molecular proportion of commercial oleyl alcohol in 190 parts of water is mixed with 50 parts of diethylene glycol monobutyl ether while stirring. The hydrogen ion concentration of the mixture is adjusted to pH=7 to 8. Very stable foams may be produced by means of the thinly liquid reaction product obtained. If part of the water be replaced by dimethyl-cellulose a highly viscous preparation is obtained.

Example 3

50 parts of the sodium salt of a dibutylated naphthalene sulphonic acid are dissolved in 175 parts of water and 25 parts of a condensation product from isethionic acid sodium salt and palm kernel fatty acid chloride are introduced in the said solution. 50 parts of triethylene glycol ethylether are added to the solution and the hydrogen ion concentration of the latter is adjusted to pH=9 to 10. A preparation having an excellent foaming power is obtained.

Example 4

48 parts of oleic acid tauride containing 30 per cent of inorganic salts are dissolved in 152 parts of water; 50 parts of ethylene glycol monocresyl ether and 50 parts of a 10 per cent solution of the sodium salt of polymerized acrylic acid are added to the said solution the hydrogen ion concentration of which is then adjusted to pH=3.

A solution of 300 grams of the mixture obtained in 200 liters of water possesses an excellent foaming power.

Example 5

30 parts of a product obtainable by reacting 6 molecular proportions of ethylene oxide with 1 molecular proportion of coconut fatty acid ethanolamide and 50 parts of diethylene glycol monobutyl ether are added to a solution of 30 parts of a highly sulphonated castor oil in 130 parts of water. A solution of 20 parts of thiourea in 40 liters of water is added to the said mixture the hydrogen ion concentration of which is then adjusted to pH=8. A reddish-brown solution of excellent foaming power is obtained.

What we claim is:—

1. The process of producing foam which comprises adding to a solution of a wetting agent free from unaltered carboxylic groups a solvent free from sulphate and sulphonic groups corresponding to the general formula

(in which $R_1$ is a hydrogen atom or an alkyl radicle, $R_2$ is a hydrogen atom, or an alkyl, aralkyl or aryl radicle, $n$ is a whole number and in which the total number of carbon atoms is at least 3) and introducing a gas in a fine division into the resulting mixture.

2. The process of producing foam which comprises adding to an aqueous solution of a wetting agent free from unaltered carboxylic groups a solvent free from sulphate and sulphonic groups corresponding to the general formula

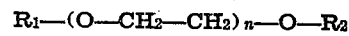

(in which $R_1$ is a hydrogen atom or an alkyl radicle, $R_2$ is a hydrogen atom, or an alkyl, aralkyl or aryl radicle, $n$ is a whole number and in which the total number of carbon atoms is at least 3) and introducing a gas in a fine division into the resulting mixture.

3. The process of producing foam which comprises adding to an aqueous solution of a wetting agent free from unaltered carboxylic groups a solvent free from sulphate and sulphonic groups corresponding to the general formula

(in which $R_1$ is a hydrogen atom or an alkyl radicle, $R_2$ is a hydrogen atom, or an alkyl, aralkyl or aryl radicle, $n$ is a whole number and in which the total number of carbon atoms is at least 3) and introducing air in a fine division into the resulting mixture.

4. The process of producing foam which comprises adding to an aqueous solution of a wetting agent free from unaltered carboxylic groups a stabilizing substance and a solvent free from sulphate and sulphonic groups corresponding to the general formula

(in which $R_1$ is a hydrogen atom or an alkyl radicle, $R_2$ is a hydrogen atom or an alkyl, aralkyl or aryl radicle, $n$ is a whole number and in which the total number of carbon atoms is at least 3) and introducing air in a fine division into the resulting mixture.

5. Preparations suitable for producing foam comprising a solution of a wetting agent free from unaltered carboxylic groups and a solvent free from sulphate and sulphonic groups corresponding to the general formula

(in which $R_1$ is a hydrogen atom or an alkyl radicle, $R_2$ is a hydrogen atom, or an alkyl, aralkyl or aryl radicle, $n$ is a whole number and in which the total number of carbon atoms is at least 3).

6. Preparations suitable for producing foam comprising a stabilizing substance, a solution of a wetting agent free from unaltered carboxylic groups and a solvent free from sulphate and sulphonic groups corresponding to the general formula $$R_1-(O-CH_2-CH_2)_n-O-R_2$$

(in which $R_1$ is a hydrogen atom or an alkyl radicle, $R_2$ is a hydrogen atom, or an alkyl, aralkyl or aryl radicle, $n$ is a whole number and in which the total number of carbon atoms is at least 3).

EBERHARD GROSS.
HANNS WAPPES.
BRUNO HILGENFELDT.
ALBERT PETZ.